United States Patent Office 3,681,278
Patented Aug. 1, 1972

3,681,278
METHOD OF VULCANIZING RUBBERS
WITH THIAZINES-1,3
Ivan Tikhonovich Gridunov, Boris Vladimirovich Unkovsky, Marina Maiorovna Donskaya, Leonid Vladimirovich Andreev, Galina Sergeevna Korolkova, Ljudmila Alexandrovna Ignatova, and Alexandr Grigorievich Grigorian, Moscow, U.S.S.R., assignors to Moskovsky Institut Tonkoi Khimicheskoi Tekhnologii Imeni M.V. Lomonosova, Moscow, U.S.S.R.
No Drawing. Filed Apr. 27, 1970, Ser. No. 32,374
Int. Cl. C08f 27/06
U.S. Cl. 260—23.7 M
21 Claims

ABSTRACT OF THE DISCLOSURE

A method of producing rubbers comprising the preparation of a mixture by blending the following components: synthetic diene rubber, a vulcanizing agent, higher fatty acids as the dispersing agent, alkali metal and alkaline earth metal oxides, zinc oxide or chalk as the activator, and 2-alkyl (aryl)amino-4H-dihydro-1,3-thiazines as the vulcanization accelerator having the general formula:

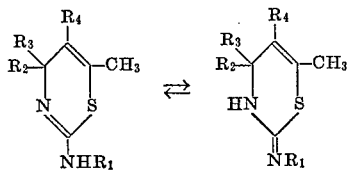

where $R_1$ is hydrogen, alkyl or aryl; $R_2$, $R_3$, $R_4$ are hydrogen or methyl, or a mixture of the said accelerator and di-2-benzothiazolyldisulfide; the obtained mixture is vulcanized at 100–200° C.

The present invention relates to the production of various rubbers from synthetic diene rubbers and especially from those types of rubbers that can be used for the manufacture of tires and other large-size objects made of rubber.

In practice there are known methods of producing rubbers from cis-1,4-polyisoprene of butadiene-methyl-styrene rubber by mixing either one of them with sulfur as the vulcanizing agent, stearic acid as the dispersing agent, alkali metal and alkaline earth metal oxides as the activator, and N,N-diethyl - 2 - benzothiazolylsulfenamide (sulfenamide BT) or a mixture of di-2-benzothiazolyldisulfide (DBTD) and diphenylguanidine (DPG) as the vulcanization accelerator.

The said curing accelerators do not provide the necessary induction period for vulcanization when used in producing large-size rubber objects from fast vulcanizing cis-1,4-polyisoprene.

Furthermore, sulfenamide BT is a liquid having a poor shelf life.

There is also known an industrial method of producing rubber from polychloroprene without sulfur modification by using magnesium oxide as the vulcanizing agent and 2-mercaptoimidazoline (Du Pont's trade name-NA-22) as the accelerating agent.

It is the object of the present invention to widen the range of accelerating agents for the vulcanization of rubbers.

This object has been accomplished by using as the vulcanization accelerator 2-alkyl(aryl)amino-4H-dihydro-1,3-thiazines, which are known to exist in two tautomeric forms:

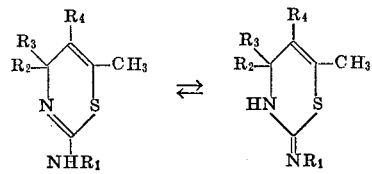

where, $R_1$ is hydrogen, alkyl or aryl; $R_2$, $R_3$, $R_4$ are hydrogen or methyl group.

The said compounds can also be used in combination with di-2-benzothiazolyldisulfide (DBTD).

According to the invention, the method of producing rubbers consists in preparing a rubber composition by mixing a synthetic diene rubber, a vulcanizing agent, a dispersing agent (higher fatty acids), an activator such as alkali metal and alkaline earth metal oxides, a vulcanization accelerator such as 2-alkyl(aryl)amino-4H-dihydro-1,3-thiazines or their combination with DBTD followed by vulcanization of the said mixture at 100–200° C.

The following may serve as examples of the said accelerators:

2-methylamino-4,4,6-trimethyl-4H-dihydro-1,3-thiazine;
2-ethylamino-4,4,6-trimethyl-4H-dihydro-1,3-thiazine;
2-propylamino-4,4,6-trimethyl-4H-dihydro-1,3-thiazine;
2-methylamino-5,6-dimethyl-4H-dihydro-1,3-thiazine;
2-phenylamino-4,4,6-trimethyl-4H-dihydro-1,3-thiazine.

The production of rubbers with the said accelerators can be carried out with or without a filler such as carbon black.

Depending on the type of rubber used, different rubber mixtures can be obtained. The recipes given below correspond to the standard recipes for the said rubbers.

One type of rubber can be produced by mixing cis-1,4-polyisoprene with sulfur as the vulcanizer, stearic acid as a dispersing agent, ZnO as the activator, and as the accelerator 2-alkyl(aryl)amino-4H-dihydro - 1,3 - thiazine which has the following general formula:

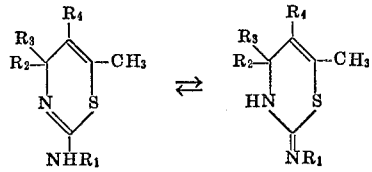

where, $R_1$ is hydrogen, or alkyl containing from 4 to 5 carbon atoms, or phenyl group; $R_2$, $R_3$, $R_4$ are hydrogen or methyl group. The said accelerator can be used in combination with di-2-benzothiazolyldisulfide (DBTD). The said components are mixed in the following amounts (parts by wt.): 100.0 cis-1,4-polyisoprene; 2.0 sulfur; 2.0 stearic acid; 3.0 zinc oxide; 0.5–1.0 2-alkyl(aryl)amino-4H-dihydro-1,3-thiazine. In the case where a combination of 2-alkyl(aryl)amino-4H-dihydro-1,3-thiazine and DBTD is used, the molar ratio of the two components must be 1:1. Curing of the produced mixture is carried out at a temperature of about 143° C.

Another type of rubber composition is one which is obtained by mixing butadiene-methylstyrene rubber with sulfur as the vulcanizer, stearic acid as the dispersing agent, zinc oxide as the activator, and a vulcanization accelerator belonging to the class of compounds such as 2-alkyl(aryl)amino-4H-dihydro-1,3-thiazines which have the following general formula:

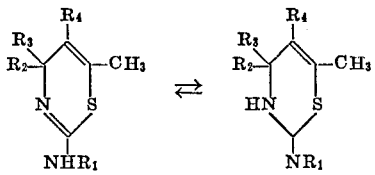

where, $R_1$ is hydrogen, or alkyl having from 1 to 5 carbon atoms, or phenyl; $R_2$, $R_3$, $R_4$ are hydrogen or a methyl group. The said accelerator may be used in conjunction with DBTD in a 1:1 molar ratio. The said components may be used in the following preferred amounts (parts by wt.): 100.0 butadiene-methyl-styrene rubber, 2.0 sulfur, 2.0 stearic acid, 5.0 zinc oxide, and 0.5–1.0 2-alkyl(aryl)amino-4H-dihydro-1,3-thiazine.

The vulcanization process is carried out at 143° C.

Production of rubber from polychloroprene without sulfur modification is carried out by mixing polychloroprene with MgO as the vulcanizing agent, stearic acid as the dispersing agent, chalk and the said accelerator as the activator. Components are taken in the following amounts (parts by wt.): 100.0 polychloroprene; 2.0 magnesium oxide; 0.5 stearic acid; 5.0 chalk; 0.5–1.0 2-alkyl(aryl)amino-4H-dihydro-1,3-thiazine as the vulcanization accelerator.

The vulcanization process is carried out at 153° C. If a mixture of the said accelerator and DBTD is used, they should be in a 1:1 molar ratio.

Rubber mixtures are processed on a roll mill in accordance with the above-given recipes. Vulcanization of the mixtures based on cis-1,4-polyisoprene and butadiene-methylstyrene rubbers is carried out on a press at a temperature of from 130 to 160° C., preferably at 143° C., and that of the composition based on polychloroprene is carried out at 100–200° C., preferably at 153° C.

The physico-mechanical properties of the vulcanized rubber are determined by standard methods.

For a better understanding of the present invention by those skilled in the art, the following examples are given by way of illustration.

EXAMPLE 1

Mixtures are prepared from cis-1,4-polyisoprene having the following composition: (mixtures No. 1 and No. 2 are given for the purpose of comparison).

TABLE 1

| Ingredients | Composition (parts by wt.) | | | |
|---|---|---|---|---|
| | 1 | 2 | 3 | 4 |
| Cis-1,4-polyisoprene | 100.0 | 100.0 | 100.0 | 100.0 |
| Sulfur | 2.0 | 1.0 | 2.0 | 2.0 |
| Sulfenamide BT | 1.0 | | | |
| DBTD | | 1.0 | | |
| DPG | | 3.0 | | |
| 2-methylamino-5,6-dimethyl-4H-dihydro-1,3-thiazine | | | 0.64 | |
| 2-ethylamino-4,4,6-trimethyl-4H-dihydro-1,3-thiazine | | | | 0.76 |
| Stearic acid | 2.0 | 1.0 | 2.0 | 2.0 |
| Zinc oxide | 3.0 | 5.0 | 3.0 | 3.0 |

In Table 2 are summarized the physico-mechanical properties of the rubbers produced from compositions given in Table 1 under optimal vulcanization conditions.

TABLE 2

| Composition number | Vulcanization period (min.) | Modulus at 500% extension (kgf./cm.²) | Tensile strength (kgf./cm.²) | Elongation (percent) |
|---|---|---|---|---|
| 1 | 30 | 60.0 | 219.0 | 595 |
| 2 | 20 | 21.0 | 240.0 | 835 |
| 3 | 70 | 31.0 | 210.0 | 920 |
| 4 | 70 | 28.0 | 250.0 | 850 |

From the data in Table 2 it can be seen that the present compounds exhibit a retarding effect on the vulcanization kinetics as compared with the known accelerators while producing practically the same physico-mechanical properties in cured rubbers.

EXAMPLE 2

Mixtures are prepared from butadiene-methylstyrene rubber of the following composition (mixture No. 1 is given for comparison purposes):

TABLE 3

| Ingredients | Composition (parts by wt.) | | | |
|---|---|---|---|---|
| | 1 | 2 | 3 | 4 |
| Butadiene-methylstyrene rubber | 100.0 | 100.0 | 100.0 | 100.0 |
| Sulfur | 2.0 | 2.0 | 2.0 | 2.0 |
| DBTD | 1.5 | | | |
| DPG | 0.3 | | | |
| 2-methylamino-4,4,6-trimethyl-4H-dihydro-1,3-thiazine | | 1.0 | | |
| 2-ethylamino-4,4,6-trimethyl-4H-dihydro-1,3-thiazine | | | 1.15 | |
| 2-propylamino-4,4,6-trimethyl-4H-dihydro-1,3-thiazine | | | | 1.36 |
| Stearic acid | 2.0 | 2.0 | 2.0 | 2.0 |
| Zinc oxide | 5.0 | 5.0 | 5.0 | 5.0 |
| Carbon black | 50.0 | 50.0 | 50.0 | 50.0 |

In Table 4 are summarized the physico-mechanical properties of the rubbers vulcanized under optimum conditions.

TABLE 4

| Composition number | Vulcanization period (min.) | Modulus at 300%–500% extension (kgf./cm.²) | Tensile strength (kgf./cm.²) | Elongation (percent) |
|---|---|---|---|---|
| 1 | 40 | 169.0 | 188.0 | 370 |
| 2 | 120 | 104.0 | 187.0 | 630 |
| 3 | 120 | 160.0 | 193.0 | 650 |
| 4 | 120 | 99.0 | 112.0 | 624 |

From the data in Table 4 it can be seen that the present compounds exhibit a retarding effect on the vulcanization kinetics as compared with the known vulcanization accelerators.

EXAMPLE 3

Compositions are prepared by recipes analogous to those for preparing composition No. 1 in Tables 1 and 3, containing the following mixtures of vulcanization accelerators. For comparison purposes, in Table 5 are summarized the properties of cured rubbers produced with the aid of known accelerators.

TABLE 5

| Type of rubber | Accelerator | Composition (parts by wt.) | Vulcanization period (min.) | Tensile strength (kgf./cm.²) |
|---|---|---|---|---|
| 1 | 2 | 3 | 4 | 5 |
| Cis-1,4-polyisoprene | Sulfenamide BT | 1.0 | 30 | 219.0 |
| | DBTD plus 2-phenylamino-4,4,6-trimethyl-4H-dihydro-1,3-thiazine (I) | 1.0+1.1 | 30 | 195.0 |
| | DBTD plus 2-methylamino-4,4,6-trimethyl-4H-dihydro-1,3-thiazine (II) | 1.0+0.8 | 30 | 220.0 |
| Butadienemethylstyrene rubber | I | 1.0+0.7 | 30 | 290.0 |
| | II | 1.0+0.5 | 30 | 260.0 |
| | DBTD plus DPG | 1.5+0.3 | 40 | 198.0 |

From the data in Table 5 it can be seen that the use of the present compounds in conjunction with DBTD considerably shortens the period required for achieving optimum vulcanization as compared with the case where these compounds are used by themselves. The physico-mechanical properties of vulcanized rubbers from butadiene-methylstyrene rubber containing the said double systems of accelerators are considerably superior as compared with those of standard vulcanized rubbers.

EXAMPLE 4

Mixtures are prepared from polychloroprene unmodified by sulfur and having the following composition, the mixtures being vulcanized at 100–200° C. (composition No. 1 is given for comparison purposes).

TABLE 6

| Ingredients | Composition (parts by wt.) | |
|---|---|---|
| | 1 | 2 |
| Polychloroprene | 100.0 | 100.0 |
| Magnesium oxide | 2.0 | 2.0 |
| Stearic acid | 0.5 | 0.5 |
| Chalk | 5.0 | 5.0 |
| NA-22 | 0.5 | |
| 2-phenylamino-4,4,6-trimethyl 4H-dihydro-1,3-thiazine | | 0.57 |

The physico-mechanical properties of rubbers obtained by the procedure described in Example 4 are summarized in Table 7.

amino)-4H-dihydro - 1,3 - thiazines having the general formula

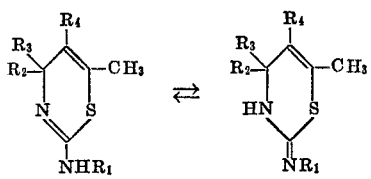

where $R_1$ is selected from the group consisting of hydrogen, alkyl and aryl; $R_2$, $R_3$ and $R_4$ are selected from the group consisting of H and $CH_3$, and vulcanizing the resultant mixture by heating at 100–200° C.

2. A method as in claim 1, wherein the vulcanization accelerator is 2-methylamino-4,4,6-trimethyl-4H-dihydro-1,3-thiazine.

3. A method as in claim 1, wherein the vulcanization accelerator is 2-ethylamino-4,4,6-trimethyl-4H-dihydro-1,3-thiazine.

4. A method as in claim 1, wherein the vulcanization accelerator is 2-propylamino-4,4,6-trimethyl-4H-dihydro-1,3-thiazine.

5. A method as in claim 1, wherein the vulcanization accelerator is 2-phenylamino-4,4,6-trimethyl-4H-dihydro-1,3-thiazine.

6. A method as in claim 1, where the vulcanization accelerator is 2-methylamino-5,6-dimethyl-4H-dihydro-1,3-thiazine.

TABLE 7

| Accelerator | Vulcanization temperature (° C.) | Vulcanization period (min.) | Modulus at 500% extension (kgf./cm.²) | Tensile strength (kgf./cm.²) | Elongation (percent) |
|---|---|---|---|---|---|
| 1 | 2 | 3 | 4 | 5 | 6 |
| NA-22 | 100 | 20 | 17 | 183 | 1,040 |
| | | 40 | 20 | 201 | 1,040 |
| | | 80 | 28 | 226 | 975 |
| | | 120 | 27 | 235 | 900 |
| | 150 | 10 | 46 | 238 | 850 |
| | | 20 | 77 | 238 | 775 |
| | | 40 | 61 | 245 | 775 |
| | | 80 | 69 | 249 | 775 |
| | 200 | 2 | 37 | 201 | 800 |
| | | 5 | 37 | 206 | 775 |
| | | 10 | 50 | 200 | 725 |
| | | 20 | 83 | 194 | 690 |
| 2-phenylmethyl-4,4,6-trimethyl-4H-dihydro-1,3-thiazine | 100 | 20 | 15 | 175 | 1,050 |
| | | 40 | 23 | 198 | 1,025 |
| | | 80 | 34 | 218 | 990 |
| | | 120 | 41 | 250 | 975 |
| | 150 | 10 | 28 | 274 | 1,000 |
| | | 20 | 37 | 300 | 910 |
| | | 40 | 41 | 308 | 890 |
| | | 80 | 42 | 318 | 900 |
| | 200 | 2 | 48 | 246 | 860 |
| | | 5 | 85 | 250 | 825 |
| | | 10 | 81 | 250 | 825 |
| | | 20 | 83 | 250 | 800 |

From the data in Table 7 it follows that the present compounds provide vulcanized rubber at vulcanization temperatures of 150° C. and 200° C. and at the same vulcanization period, with better physical-mechanical properties than the industrially used product NA-22.

What is claimed is:

1. A method for producing vulcanized rubbers comprising preparing a mixture by blending the following components: a synthetic diene rubber, a vulcanizing agent selected from the group consisting of sulfur, sulfur-releasing vulcanizing agents and magnesium oxide, a higher fatty acid dispersing agent, an activator selected from the group consisting of alkali metal oxides, alkaline earth metal oxides, zinc oxide and chalk, and a vulcanization accelerator selected from 2-alkyl-amino (aryl- 7. A method as in claim 1, where the mixture of said components further includes carbon black as a filler.

8. A method as in claim 1, wherein the accelerator is a combination of 2-alkylamino-(arylamino)4H-dihydro-1,3-thiazines and di-2-benzothiazolyldisulfide.

9. A method as in claim 8, wherein the combination of 2-alkylamino-(arylamino)4H-dihydro - 1,3 - thiazines and di-2-benzothiazolyldisulfide is taken in a 1:1 molar ratio.

10. A method as in claim 1, wherein the mixture is prepared by blending cis-1,4-polyisoprene, sulfur as the vulcanizing agent, stearic acid as the dispersing agent, ZnO as the activator, and a compound belonging to the class of 2 - alkylamino(arylamino)-4H-dihydro-1,3-thiazines as the vulcanization accelerator having the following general formula:

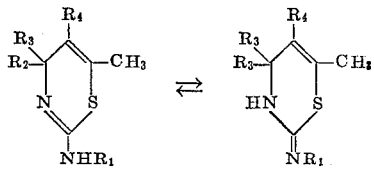

where $R_1$ is selected from the group consisting of hydrogen, alkyl having from 1 to 5 carbon atoms, and phenyl, $R_2$, $R_3$ and $R_4$ are H and $CH_3$, the resultant mixture being vulcanized by heating at 130–160° C.

11. A method as in claim 10, wherein the vulcanization accelerator is a mixture of 2-alkylamino(arylamino)-4H-dihydro-1,3-thiazines and di-2-benzothiazolyldisulfide in a 1:1 molar ratio.

12. A method as in claim 10, wherein the components of the mixture are taken in the following amounts (parts by wt.): 100.0 cis-1,4-polyisoprene, 2.0 sulfur, 2.0 stearic acid, 3.0 zinc oxide, and 0.5–1.0 2-alkylamino(arylamino)-4H-dihydro-1,3-thiazine.

13. A method as in claim 10, wherein the vulcanization is carried out at 143° C.

14. A method as in claim 1, where the mixture is prepared by blending butadiene-methylstyrene rubber, sulfur as the vulcanizing agent, stearic acid as the dispersing agent, ZnO as the activator, and a compound belonging to the class of 2-alkylamino(arylamino)-4H-dihydro-1,3-thiazines as the vulcanization accelerator having the following general formula:

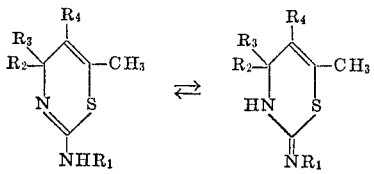

where $R_1$ is selected from the group consisting of H, alkyl $C_1$–$C_5$, phenyl, $R_2$, $R_3$ and $R_4$ are selected from the group consisting of H and $CH_3$, the resultant mixture being vulcanized by heating at 130–160° C.

15. A method as in claim 14, wherein the components of the mixture are taken in the following amounts (parts by wt.): 100.0 butadiene-methylstyrene rubber, 2.0 sulfur, 2.0 stearic acid, 5.0 ZnO, and 1–1.5 2-alkylamino-(arylamino)-4H-dihydro-1,3-thiazine.

16. A method as in claim 14, wherein the vulcanization accelerator is a combination of 2-alkylamino(arylamino)-4H-dihydro-1,3-thiazine and di-2-benzothiazolyldisulfide in a 1:1 molar ratio.

17. A method as in claim 14, wherein the vulcanization is carried out at 143° C.

18. A method as in claim 1, wherein the mixture is prepared by mixing polychloroprene unmodified by sulfur, MgO as the vulcanizing agent, stearic acid as the dispersing agent, chalk as the activator and a compound belonging to the class of 2-alkylamino(arylamino)-4H-dihydro-1,3-thiazines as the vulcanization accelerator and having the following formula:

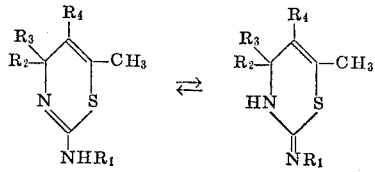

where $R_1$ is selected from the group consisting of hydrogen, alkyl $C_1$–$C_5$, and phenyl; $R_2$, $R_3$ and $R_4$ are selected from the group consisting of H and $CH_3$, the resultant mixture being vulcanized at 100–200° C.

19. A method as in claim 18, wherein the components are taken in the following amounts (parts by wt.): 100.0 polychloroprene, 2.0 MgO, 0.5 stearic acid, 5.0 chalk, and 0.5–1.0 2-alkylamino(arylamino)-4H-dihydro-1,3-thiazine.

20. A method as in claim 19, wherein the vulcanization is carried out at 153° C.

21. A method as in claim 19, where the accelerator is a mixture of 2-alkylamino(arylamino)-4H-dihydro-1,3-thiazines and di-2-benzothiazolyldisulfide in a 1:1 molar ratio.

References Cited
UNITED STATES PATENTS 2,946,788  7/1960  Asinger _____ 260—243 R

FOREIGN PATENTS 496,560  11/1938  Great Britain _____ 260—79.5

JOSEPH L. SCHOFER, Primary Examiner

C. A. HENDERSON, Jr, Assistant Examiner

U.S. Cl. X.R.

260—41.5 R, 79.5 B, 92.3, 784, 785, 790, 791, 797